June 23, 1953 — L. E. SMILEY — 2,642,667

EXTENSIBLE RULE

Filed April 25, 1950 — 2 Sheets-Sheet 1

INVENTOR.
LOWELL E. SMILEY
BY
Oberlin & Limbach
ATTORNEYS.

June 23, 1953   L. E. SMILEY   2,642,667
EXTENSIBLE RULE

Filed April 25, 1950   2 Sheets-Sheet 2

INVENTOR.
LOWELL E. SMILEY
BY
Oberlin + Limbach
ATTORNEYS.

Patented June 23, 1953

2,642,667

UNITED STATES PATENT OFFICE 2,642,667

EXTENSIBLE RULE

Lowell E. Smiley, Lorain, Ohio

Application April 25, 1950, Serial No. 157,923

14 Claims. (Cl. 33—161)

This invention relates to measuring devices and, more particularly, to a folding rule comprising a plurality of sections pivotally connected end to end and having an extension slide in one of the end sections thereof.

It has been not uncommon to provide folding rules with a slidable member mounted in an end section thereof, making such rules especially convenient for taking inside measurements. The user merely unfolds the rule (starting with that end which carries the extension slide) to approximately the distance to be measured and then slides the extension member outwardly until the distance between the two points being measured is accurately recorded on the rule. However, where a measurement is to be taken between two points difficult of direct access, it is frequently impossible to remove the rule for reading without first somewhat retracting the extended slide. Accurate measurements in such situations have consequently been most difficult to obtain.

A primary object of my invention is, accordingly, to provide an extensible rule particularly adapted to the taking of precise measurements in awkward situations, as where both ends of the rule must be inserted through constricted openings.

Another object is to provide an extensible rule with a sliding member mounted in an end section thereof which may be retracted in order to remove the rule, but which will then snap back and return to its original extended position, thus accurately indicating the distance between the two points measured.

Still another object is to provide a resilient sliding member for the end section of a folding rule which may be held rigid and fully extended while the measurement is being taken.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
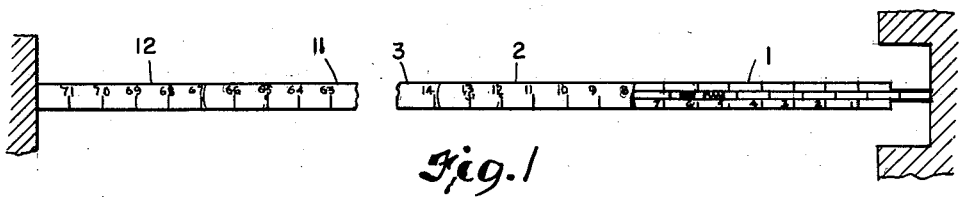
Fig. 1 is a view of one embodiment of my invention in the form of a folding extensible rule shown as it would be used to ascertain the distance between two inside points, one of which has a constricted entrance.
Figure 2:
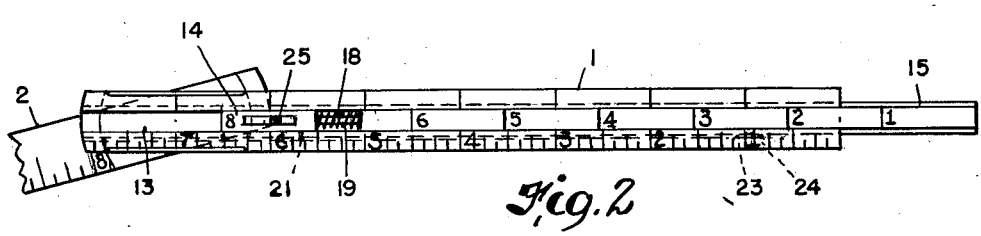
Fig. 2 is a top plan view of an end section carrying an extension slide, and showing also a portion of the next adjacent section of the rule.
Figure 3:
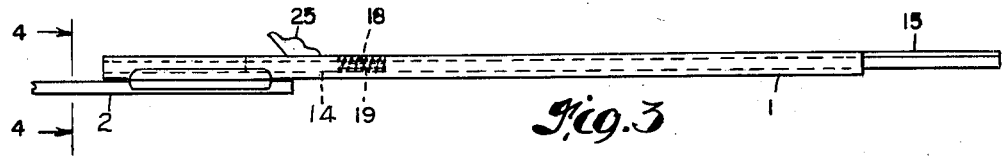
Fig. 3 is a side elevation of such end section with the extension slide partially extended.
Figure 4:
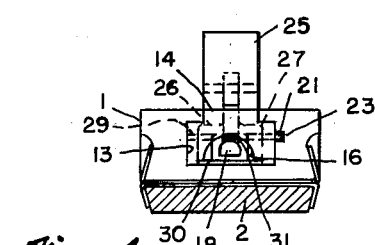
Fig. 4 is a view taken along the line 4—4 on Fig. 3.
Figure 5:
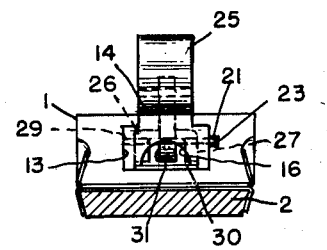
Fig. 5 is similar to Fig. 4 but shows the clamping device in an alternate position.
Figure 6:
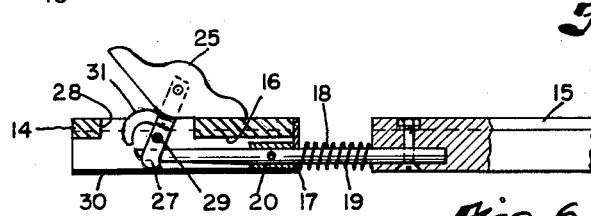
Fig. 6 is a side elevation of a portion of the extension slide, partly in section, and with the clamping device in the Fig. 4 position.
Figure 7:
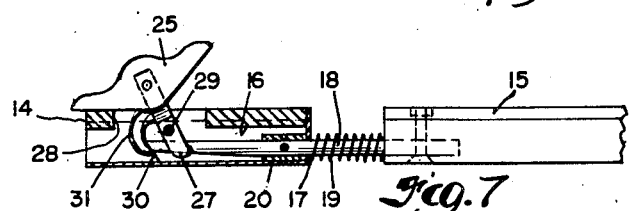
Fig. 7 is similar to Fig. 6, but shows the clamping device in the Fig. 5 position.
Figure 8:
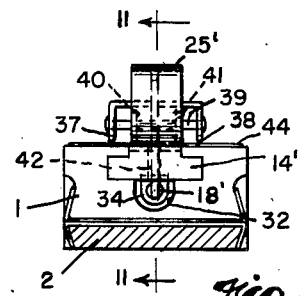
Fig. 8 is a transverse sectional view of a folding rule having a modified form of extension slide, and showing also the clamping device for such slide.
Figure 9:
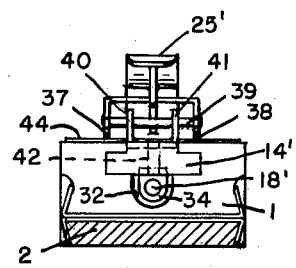
Fig. 9 is similar to Fig. 8 but with the clamping device shown in an alternate position.
Figure 10:
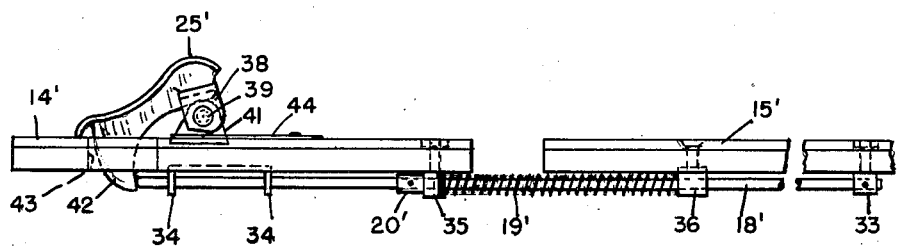
Fig. 10 is a side elevation of a portion of such modified form of slide with the clamping device in the Fig. 8 position.
Figure 11:
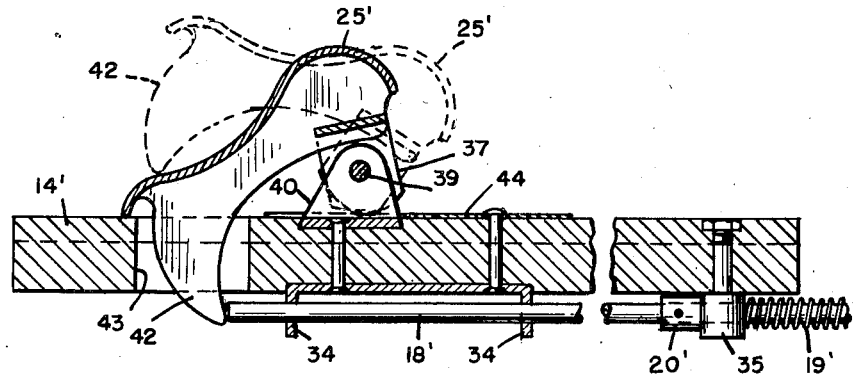
Fig. 11 is an enlarged sectional view taken along the line 11—11 on Fig. 8.

Referring now to Figs. 1-7 of the drawing and more particularly to Fig. 1, the preferred embodiment of my invention there shown comprises a folding rule composed of a plurality of sections, identified by numerals 1 to 12, which are pivotally connected end to end in such manner as to snap into longitudinally aligned series when opened. The rule may, of course, be of any suitable length, the standard folding rule of twelve sections with eight inches to each section having been chosen for purposes of illustration only.

End section 1 is provided with a longitudinally extending groove 13 of inverted T-shaped cross-section in which is slidably mounted an extension slide of similar cross-section. The extension slide comprises two longitudinally spaced members 14 and 15, the former having a groove 16 extending longitudinally of the underside thereof, with a shoulder 17 secured thereto and providing a constricted entrance to such groove at the right-hand end of such member as viewed in Figs. 6 and 7. A rod 18 connects such members 14 and 15, being mounted for sliding movement in the groove 16 of member 14 and, of course, passing through a hole in shoulder 17, and rigidly secured to member 15. A compression spring 19, carried by rod 18 and interposed between such members, is effective resiliently to space them apart. Secured to such rod 18 to the side of shoulder 17 opposite spring 19 is a collar 20 which is adapted to engage such shoulder and thereby provide a maximum limit to the longitudinal spacing of members 14 and 15.

A laterally projecting stud 21 is secured to one side of member 14 (Figs. 4 and 5) which is adapted to slide in longitudinally extending groove or slideway 23 formed in the side of groove 13. Such slideway is open at the left-hand end of section 1 to permit of assembly (Fig. 2) and terminates short of the right-hand end thereof forming a shoulder 24 appropriately located so as to engage such stud to prevent slide member 15 from being pushed to the right all the way out of end section 1. Although member 15 is only slightly more than 6½ inches long (see Fig. 2), still the extension slide need project no more than 6 inches to record any and all intermediate distances within the total length of the instrument. This means that the gap in the slide assembly never reaches the end of section 1 and slide member 15 is always properly seated in such section.

A clamp 25 is hinged to member 14 by means of depending ears or hinge members 26 and 27 which may be formed integrally with clamp 25, such hinge members extending downwardly through a vertical slot 28 in member 14 and terminating above the bottom surface of groove 13, being formed to receive a transverse hinge pin 29 mounted in member 14.

The lower extremities of such hinge members are eccentric to hinge pin 29 and therefore serve as cams when clamp 25 is rocked.

A flexible metal plate 30, secured at its right-hand end (Fig. 6) to the bottom face of member 14, is interposed between the surface of groove 13 and such lower cam extremities of hinge members 26 and 27. Clamp 25 is also provided with a depending projection or tongue 31 which likewise extends through slot 28 and abuts the end of rod 18 (in one rotative position of clamp 25), thereby locking rod 18 to retain members 14 and 15 in fully spaced relationship.

Referring next to Figs. 8-11, a folding rule having an end section with a modified form of construction is there illustrated. The longitudinally extending groove 32 of end section 1 differs from the groove 13 of the embodiment first described in that the lower portion thereof is hollowed out in order to accommodate the connecting rod 18' which is located beneath the extension slide, being fixedly secured at one end to the post 33 of member 15' and slidably secured to member 14' by collars 34 depending therefrom. Spring 19' is carried by such rod and interposed between fixed collars 35 and 36 depending respectively from members 14' and 15' and slidably embracing the rod. Secured to the rod to the opposite side of collar 35 from spring 19' is a collar 20' which is adapted to engage the collar 35 and thereby serve as a stop to provide a maximum limit to the longitudinal spacing of members 14' and 15'. Clamp 25' is hinged to the upper face of member 14', having depending ears or hinge members 37 and 38 which may be formed integrally with the clamp, such hinge members extending laterally outwardly and downwardly and terminating above the surface of section 1 to receive hinge pin 39 carried by upstanding hinge members 40 and 41 secured to the upper face of member 14'.

The lower extremities of such hinge members 37 and 38 are eccentric about hinge pin 39 and therefore serve as clamping cams when the clamp is rocked.

Depending from clamp 25' is a projection or tongue 42 which is adapted to extend through the longitudinal slot 43 of such member 14' and engage the end of rod 18', thereby maintaining members 14' and 15' fully spaced. A flexible metal plate 44 is likewise secured to the upper face of member 14' having laterally extending wings which overlie the upper surface of end section 1 beneath the lower extremities of hinge members 37 and 38.

Having thus described certain preferred embodiments of my invention, the operation thereof becomes readily apparent. For example, should the user desire to measure the distance between two points as illustrated in Fig. 1 of the drawing, he will merely unfold the rule, starting with end section 1, to approximately the distance between the two points to be measured. The remaining gap may then be covered by means of the extension slide which is moved outwardly until the forward end of member 15 engages such measuring point. Of course, as the extension slide is moved outwardly, it will be understood that clamp 25 will be in the position shown in Figs. 5 and 7 with the depending tongue abutting the end of rod 18, thus holding members 14 and 15 rigidly in fully spaced relationship. The inner curve of tongue 31 comprises an arc having hinge pivot 29 as its center and the end of rod 18 is similarly curved. Consequently, when the operator rocks clamp 25 forwardly with his thumb, tongue 31 will maintain engagement with rod 18 to hold members 14 and 15 rigidly apart until the cams 26 and 27 have turned sufficiently to lock slide member 14 in section 1. An accurate measurement, without any accidental slipping, is thereby assured.

When the rule and extension slide have been opened sufficiently to record the distance between the two points of measurement, the user will press forwardly upon clamp 25 (in a clockwise direction as viewed in Fig. 7) causing the lower extremities of hinge members 26 and 27 to cam downwardly upon flexible plate 30 pressing the latter tightly between such hinge members and the surface of groove 13. In the embodiment illustrated in Figs. 8-11, flexible plate 44 will, of course, be held tightly between hinge members 37 and 38 and the upper face of end section 1. With clamp 25 thus rotated as far as possible in a clockwise direction, the cam surfaces of the hinge members of such clamp are effective to urge the hinge pin upwardly, thus causing member 14 to be pressed against the slideways of the groove of section 1, locking such member tightly relative thereto. Depending tongue 31 (and corresponding tongue 42) is shaped and dimensioned to maintain contact with the end of rod or plunger 18 until slide member 14 has been firmly clamped in position by rocking of clamp 25. Consequently, there is no possibility of member 14 being inadvertently shifted after once having been properly positioned. In the case of the Fig. 11 form this would mean that clamping cams 37 and 38 should be shaped to become effective immediately upon thus starting to rock clamp 25'.

It will be noted that sufficient advancement, or clockwise rotation, of clamp 25 causes the depending tongue to disengage the end of rod 18, thus permitting retraction of member 15 of the extension slide against the action of compression spring 19. The rule is thus easily removed without losing the record of measurement since member 15 will snap back fully spaced from member 14 against the stop or collar 20 by action of compression spring 19.

It might be emphasized that the folding rule of my invention is particularly useful where a high degree of accuracy is desired, requiring that the rule be opened until it so tightly engages both measuring points that it cannot be removed by merely folding an open section. Instead, the resilient extension slide is merely collapsed a fraction of an inch (it has been found that 1/8"–1/2" is ordinarily sufficient) whereupon the rule may be easily and quickly removed while retaining an accurate record of measurement. It will also be appreciated that the sections of my folding rule may be of any desired length, and the principle of the invention may, of course, be utilized with other than folding rules. The gap between members 14 and 15 may also be covered and concealed, if desired, by provision of an upper flange on one such member adapted to overlie the other member when the spring is further compressed.

Other modes of applying the principle of the invention may be employed, change being made as regards the details described, provided the features stated in any of the following claims, or the equivalent of such, be employed.

I therefore particularly point out and distinctly claim as my invention:

1. In an extensible folding rule comprising a plurality of sections pivotally connected end to end, a longitudinal slideway in one of the end sections, an extension slide mounted for sliding movement therein comprising two longitudinally spaced interconnected members resiliently spaced apart, a stop limiting such maximum longitudinal spacing of said members, clamping means for releasably locking the inner one of said members to such end section, and lock means selectively operative to lock said members in fully spaced relation.

2. In an extensible folding rule comprising a plurality of sections pivotally connected end to end, a longitudinal slideway in one of the end sections, an extension slide mounted for sliding movement therein comprising two longitudinally spaced interconnected members, a rod secured to one of said members for slidably connecting said members, a slideway in the other one of said members adapted slidably to receive said rod and having a shoulder at the end adjacent the first one of said members, resilient means carried by said rod and interposed between said two members adapted resiliently to space said members apart, a collar secured to said rod to the side of said shoulder opposite said resilient means and adapted to engage said shoulder, thereby limiting such maximum longitudinal spacing of said two members, clamping means for releasably locking the inner one of said members to such end section, and lock means selectively operative to lock said members in fully spaced relation.

3. In an extensible folding rule comprising a plurality of sections pivotally connected end to end, a longitudinal slideway in one of the end sections, an extension slide mounted for sliding movement therein comprising two longitudinally spaced interconnected members resiliently spaced apart, clamping means for releasably locking the inner one of said members to such end section, said clamping means being hingedly secured to said inner member and having a depending ear terminating above the surface of said slideway, and a flexible plate secured to the under surface of said inner member interposed between said depending ear and the surface of said slideway, said depending ear being adapted, in one rotative position of said clamping means, to engage said plate and hold the latter tightly against the surface of said slideway.

4. In an extensible folding rule comprising a plurality of sections pivotally connected end to end, a longitudinal slideway in one of the end sections, an extension slide mounted for sliding movement therein comprising two longitudinally spaced interconnected members resiliently spaced apart, a stop limiting such maximum longitudinal spacing of said members, clamping means for releasably locking the inner one of said members to such end section, said clamping means being hingedly secured to said inner member and having a pair of depending ears laterally spaced and terminating above the surface of said slideway, a flexible plate secured to the under surface of said inner member interposed between said depending ears and the surface of said slideway, said depending ears being adapted, in one rotative position of said clamping means, to engage said plate and hold the latter tightly against the surface of said slideway, and manually operable lock means selectively operative to lock said members in fully spaced relation.

5. In an extensible folding rule comprising a plurality of sections pivotally connected end to end, a longitudinal slideway in one of the end sections, an extension slide mounted for sliding movement therein comprising two longitudinally spaced interconnected members, a slideway in the inner one of said members having a shoulder at the end adjacent the outer one of said members, a rod mounted for sliding movement in said second slideway and secured to said outer member, spring means carried by said rod and interposed between said two members adapted resiliently to space said members apart, a collar secured to said rod to the side of said shoulder opposite said spring means and adapted to engage said shoulder, thereby limiting such maximum longitudinal spacing of said two members, clamping means for releasably locking said inner member to such end section, said clamping means being hingedly secured to said inner member and having a tongue depending therefrom adapted, in one rotative position of said clamping means, to engage an end of said rod, thereby locking said two members in fully spaced relation, said clamping means also having a pair of depending ears laterally spaced and terminating above the surface of the first said slideway, and a flexible plate secured to the under surface of said inner member interposed between said depending ears and the surface of the first said slideway, said depending ears being adapted, in an alternate rotative position of said clamping means, to engage said plate and hold the latter tightly against the surface of said first slideway.

6. In an extensible folding rule comprising a plurality of sections pivotally connected end to end, a longitudinal slideway in one of the end sections, an extension slide mounted for sliding movement therein comprising two longitudinally spaced interconnected members, a rod secured to one of said members for slidably connecting said members together, a collar on the other of said members slidably embracing said rod, a collar secured to said rod adapted to engage said first collar and limit such maximum longitudinal spacing of said two members, resilient means carried by said rod adapted resiliently to space said two members apart, clamping means for releasably locking the inner one of said members to such end section, and lock means selectively operative to lock said two members in fully spaced relation.

7. In an extensible folding rule comprising a plurality of sections pivotally connected end to end, a longitudinal slideway in one of the end sections, an extension slide mounted for sliding movement therein comprising two longitudinally spaced interconnected members resiliently spaced apart, clamping means for releasably locking the inner one of said members to such end section, said clamping means being hingedly secured to the outer face of said inner member and having a depending ear terminating above the outer face of such end section, and a flexible plate secured to said inner member lying interposed between said depending ear and the outer face of such end section, said depending ear being adapted, in one rotative position of said clamping means, to engage said plate and hold the latter tightly against the outer face of such end section.

8. In an extensible folding rule comprising a plurality of sections pivotally connected end to end, a longitudinal slideway in one of the end sections, an extension slide mounted for sliding movement therein comprising two longitudinally spaced interconnected members resiliently spaced apart, a stop limiting such maximum longitudinal spacing of said members, clamping means for releasably locking the inner one of said members to such end section, said clamping means being hingedly secured to the outer face of said inner member and having a pair of depending ears laterally spaced and terminating above the outer face of such end section, a flexible plate secured to said inner member having side portions which lie interposed between said depending ears and the outer face of said end section, said depending ears being adapted, in one rotative position of said clamping means to engage said plate and hold the latter tightly against the outer face of such end section, and manually operable lock means operative to lock said two members in fully spaced relation.

9. In an extensible folding rule comprising a plurality of sections pivotally connected end to end, a longitudinal slideway in one of the end sections, an extension slide mounted for sliding movement therein comprising two longitudinally spaced interconnected members, a rod secured to the outer one of said members for slidably connecting said members, a collar on the inner one of said members slidably embracing said rod, a collar secured to said rod adapted to engage said first collar and limit such maximum longitudinal spacing of said two members, spring means carried by said rod adapted resiliently to space said two members apart, clamping means for releasably locking said inner member to such end section, said clamping means being hingedly secured to the outer face of said inner member and having a tongue depending therefrom adapted, in one rotative position of said clamping means, to engage an end of said rod, thereby locking said two members in fully spaced relation, said clamping means also having a pair of depending ears laterally spaced and terminating above the outer face of such end section, and a flexible plate secured to said inner member having side portions which lie interposed between said depending ears and the outer face of such end section, said depending ears being adapted, in an alternate rotative position of said clamping means, to engage said plate and hold the latter tightly against the outer face of such end section.

10. A linear measuring instrument including a slide adapted to be extended therefrom, said slide comprising two axially spaced members, resilient means urging said members apart, stop means limiting the maximum extent of such axial spacing, means releasably rigidly securing said two members in such maximum spaced relationship, and means operative to secure the inner one of said members in selected adjusted position relative to the body of said instrument, said latter means being automatically operative when said means rigidly securing said members in spaced relationship is released.

11. A linear measuring instrument including a slide adapted to be extended therefrom, said slide comprising two axially spaced members, resilient means adapted to urge said members apart, means adapted to limit the extent of such axial spacing, a rod secured to one of said members and extending parallel to the other said member, and rockable clamping means on said latter member adapted to clamp said member against movement and adapted in unclamped position to engage said rod to hold the other said member in rigidly spaced relationship thereto and only in clamped position to release said rod to permit movement of said other member against the action of said resilient means.

12. A linear measuring instrument comprising a body portion and a slide adapted to be extended therefrom, said slide comprising two axially spaced members, resilient means adapted to urge said members apart, means adapted to limit the extent of such axial spacing, one of said members bearing measuring indicia and adapted to be extended from said body portion and the other said member being provided with clamping means and adapted to remain seated in said body portion, a rod secured to said extensible member and extending parallel to the other said member, and a clamp pivotally mounted on said latter member including a catch adapted to engage the end of said rod to hold the said extensible member in rigidly spaced relationship and including clamping means operative when rocked to clamp said slide member on which it is thus mounted to said body portion, said catch and rod end being curved in their engaging portions on an arc centered on such pivot and dimensioned to maintain partial engagement until said clamp has been rocked sufficiently to secure said slide member on which it is mounted to said body portion.

13. A linear measuring instrument having a longitudinal slideway communicating with an end thereof, an extension slide mounted for sliding movement therein comprising two longitudinally spaced interconnected members, resilient means urging said members apart, stop means limiting such maximum longitudinal spacing of said members, clamping means for releasably locking the inner one of said members in such slideway, and means selectively operable to lock said members in maximum spaced relation.

14. A linear measuring instrument having a longitudinal slideway communicating with an end thereof, an extension slide mounted for sliding movement therein comprising two longitudinally spaced interconnected members, resilient means urging said members apart, stop means limiting such maximum longitudinal spacing of said members, clamping means associated with the inner one of said members for releasably locking the same in which slideway, and lock means operative at substantially the same point as said clamping means selectively operable to lock said members in fully spaced relation.

LOWELL E. SMILEY.

References Cited in the file of this patent

UNITED STATES PATENTS

| Number | Name | Date |
|---|---|---|
| 1,081,995 | Voggenreiter | Dec. 23, 1913 |
| 1,432,834 | Buck | Oct. 24, 1922 |
| 1,583,585 | Emery | May 4, 1926 |
| 2,270,355 | Swanson | Jan. 20, 1942 |